Figure 1:
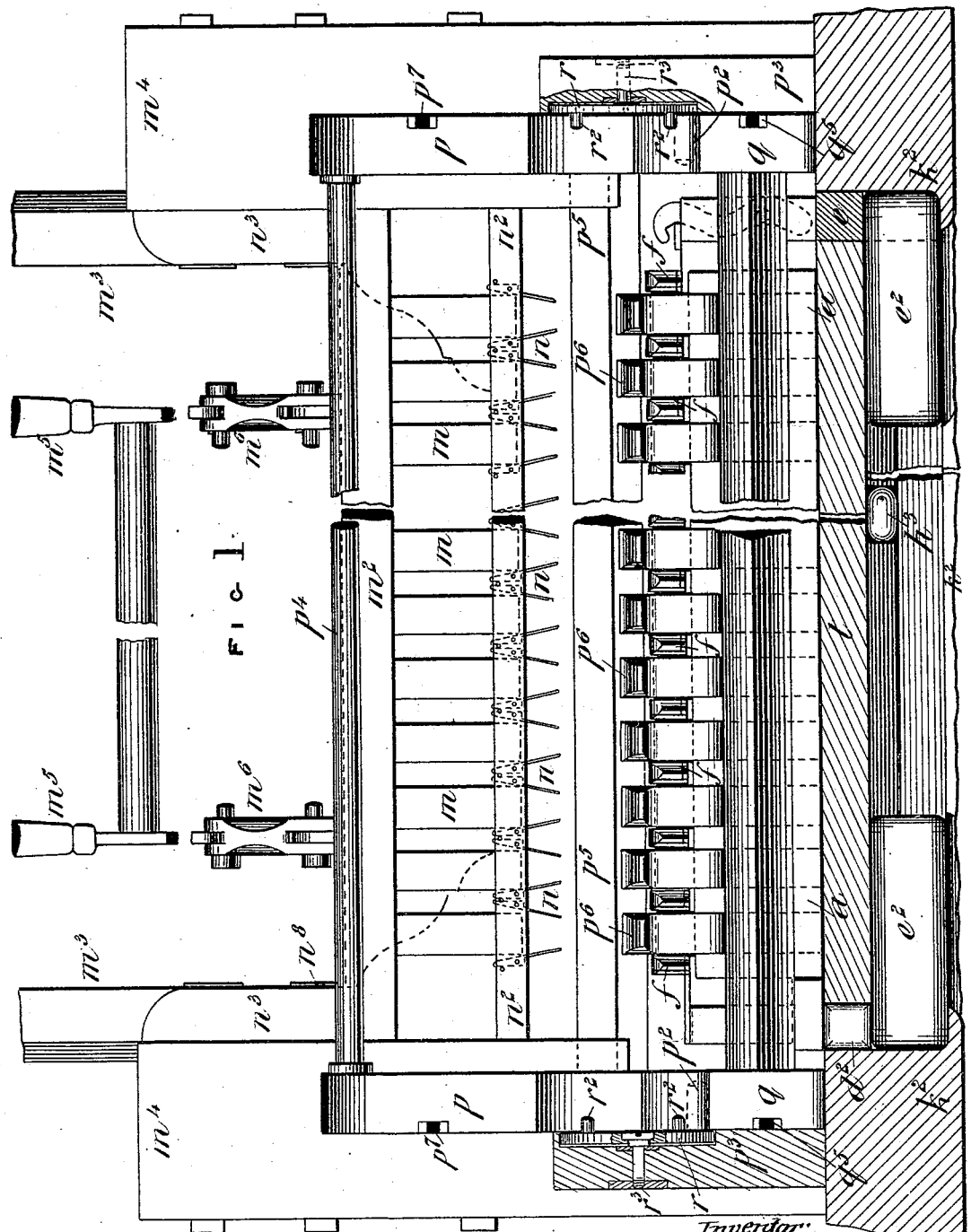

(No Model.)  11 Sheets—Sheet 1.

G. PRITCHARD.
PACKET FOLDING AND COMPRESSING MACHINE.

No. 251,281. Patented Dec. 20, 1881.

Witnesses:
E. E. Masson
W. B. Masson

Inventor:
George Pritchard
by A. Pollok
his attorney

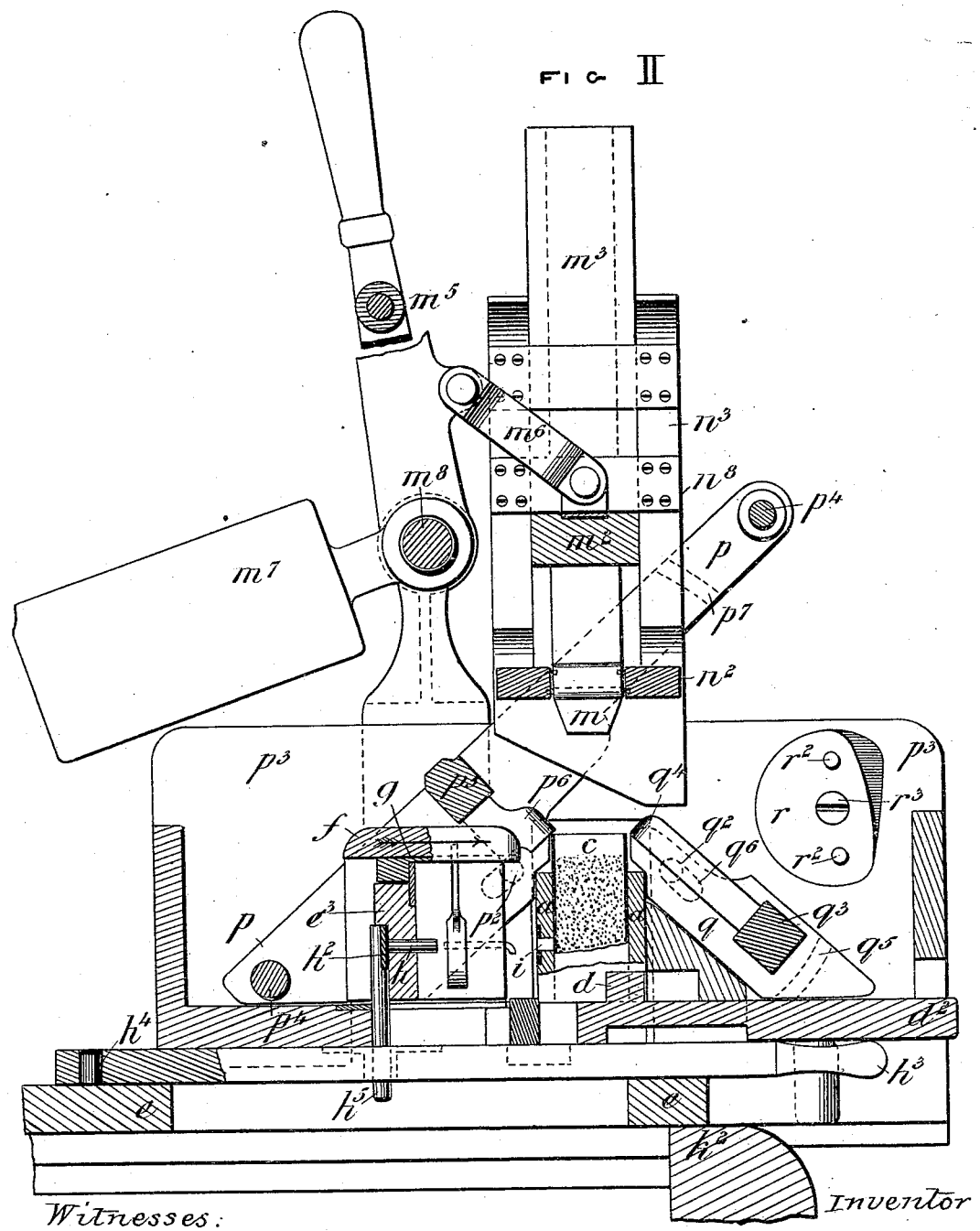

(No Model.) 11 Sheets—Sheet 3.
G. PRITCHARD.
PACKET FOLDING AND COMPRESSING MACHINE.
No. 251,281. Patented Dec. 20, 1881.
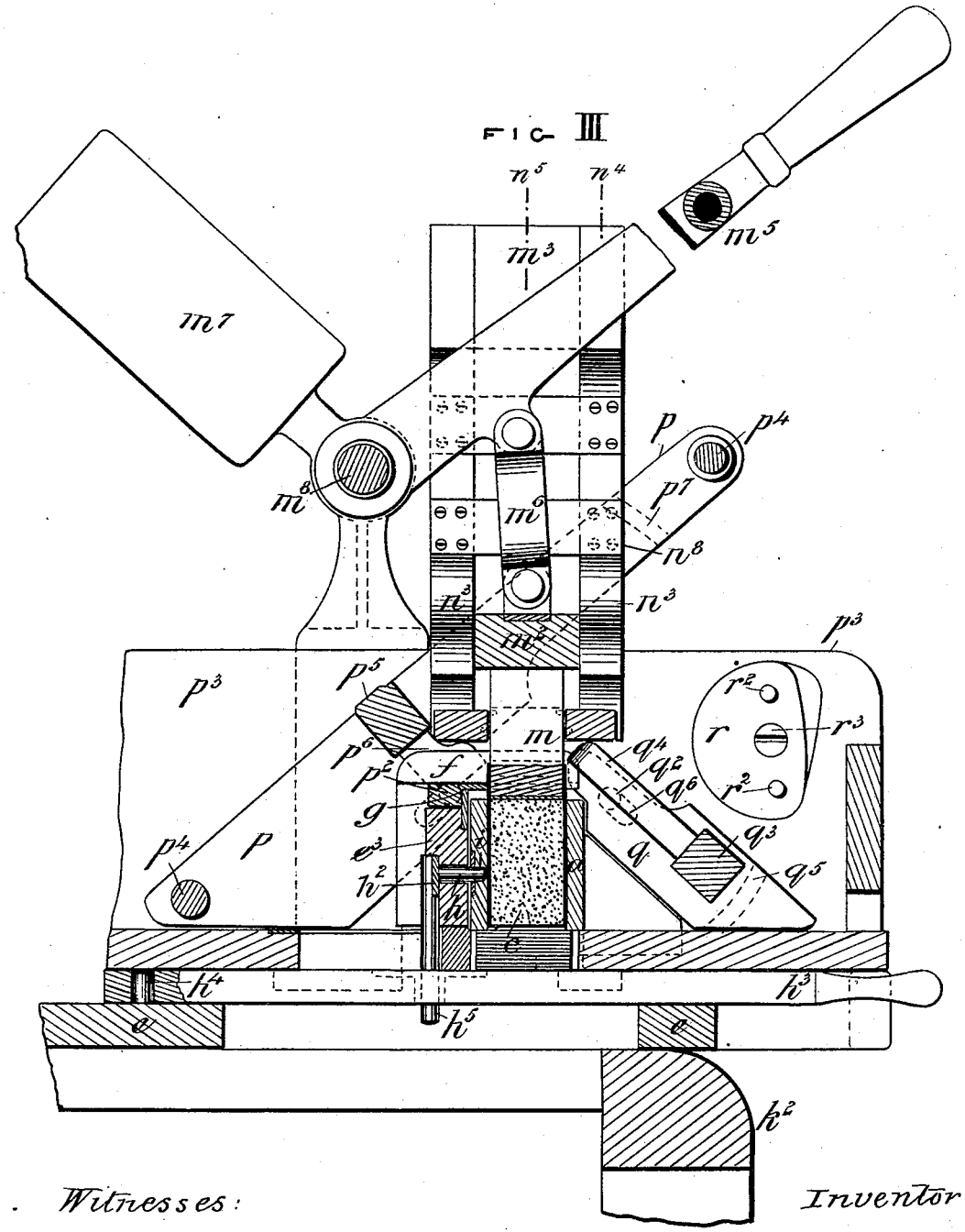
Witnesses:
E. E. Masson
W. B. Masson
Inventor
George Pritchard
by A. Pollok
his attorney (No Model.)  
11 Sheets—Sheet 4.
G. PRITCHARD.
PACKET FOLDING AND COMPRESSING MACHINE.
No. 251,281.  
Patented Dec. 20, 1881.
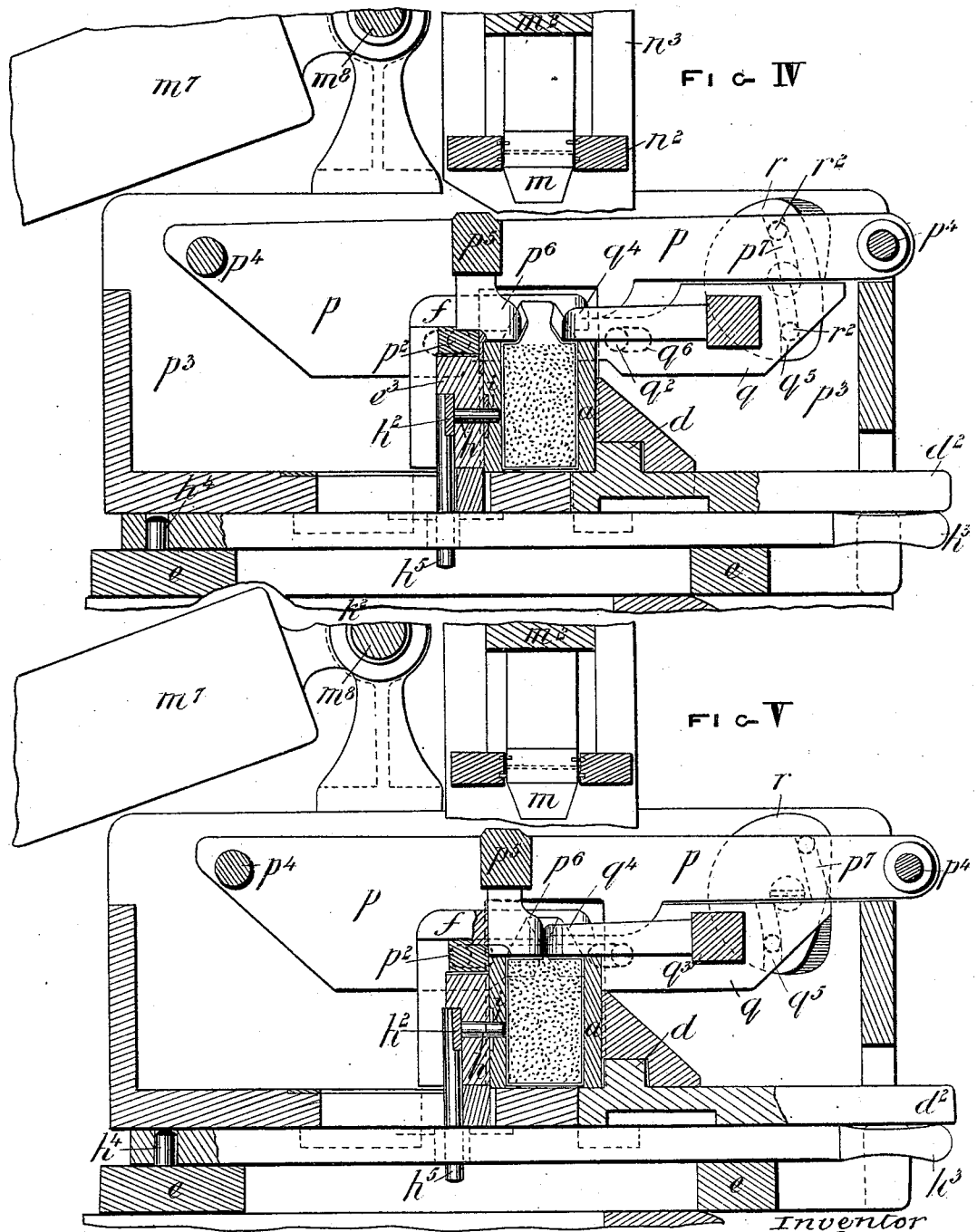
Witnesses:  
E. E. Masson  
W. B. Masson
Inventor  
George Pritchard  
by A. Pollok  
his attorney

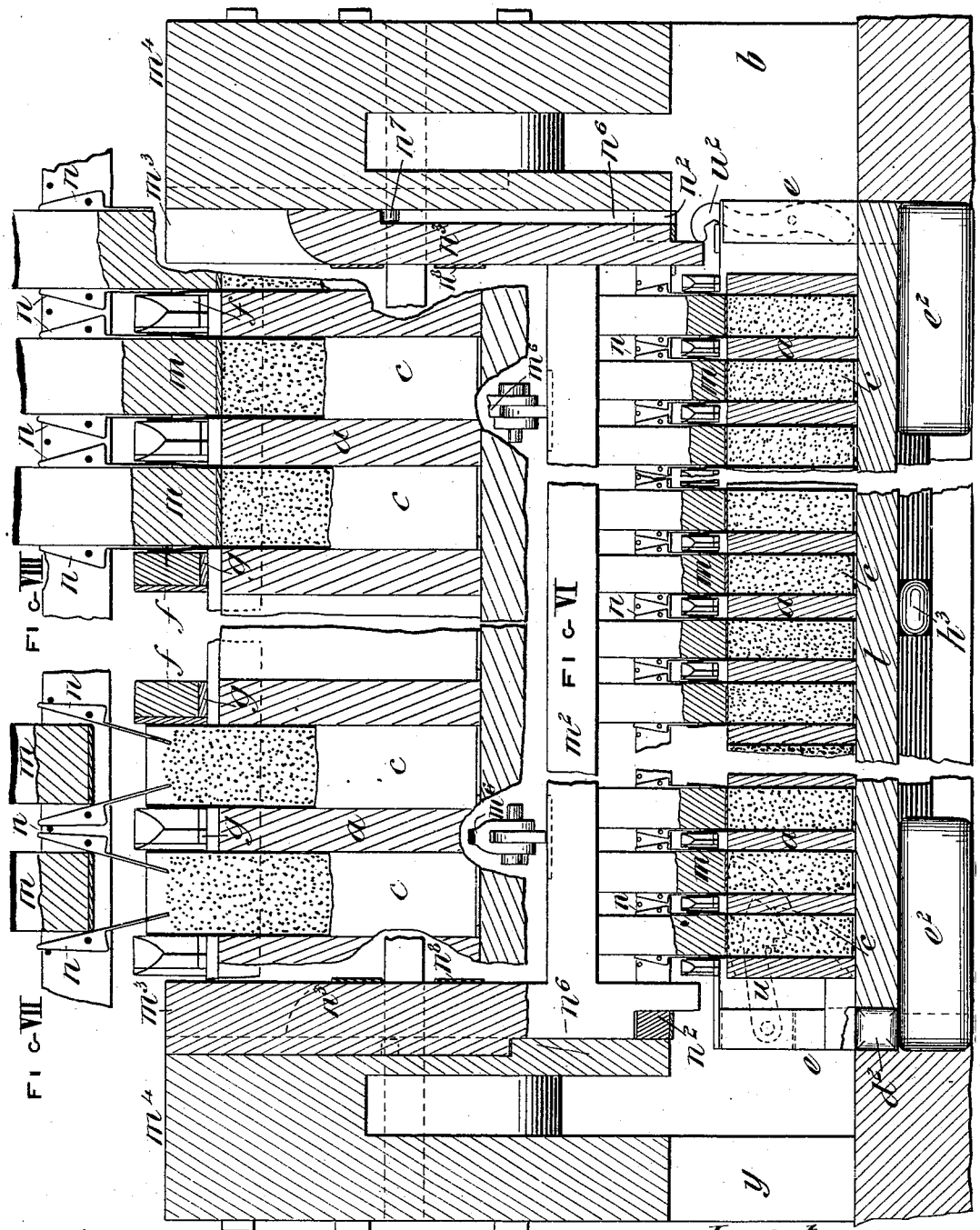

(No Model.) 11 Sheets—Sheet 6.
G. PRITCHARD.
PACKET FOLDING AND COMPRESSING MACHINE.
No. 251,281. Patented Dec. 20, 1881.
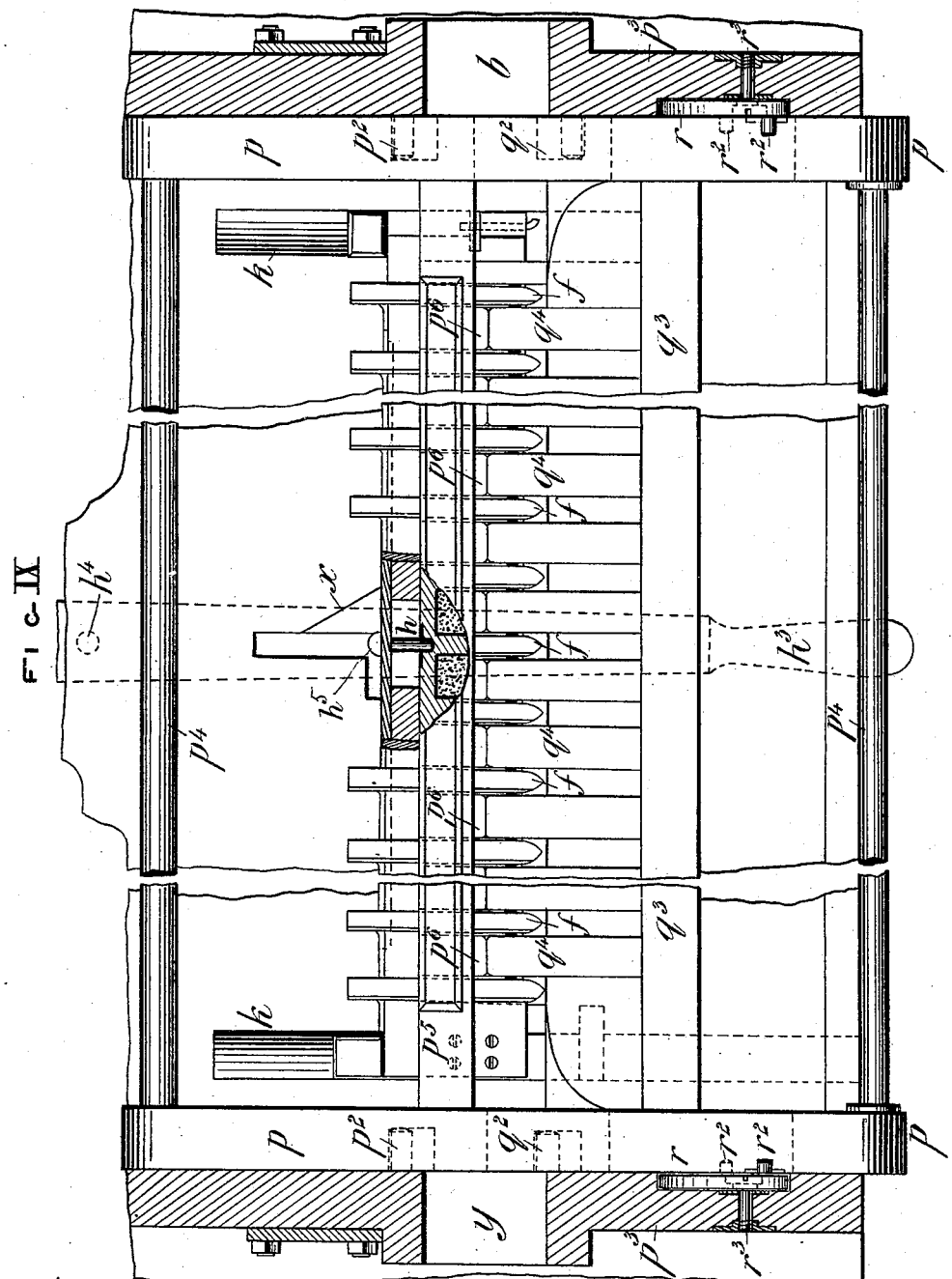
Witnesses
E. E. Masson
W. B. Masson
Inventor:
George Pritchard
by A. Pollok
his attorney

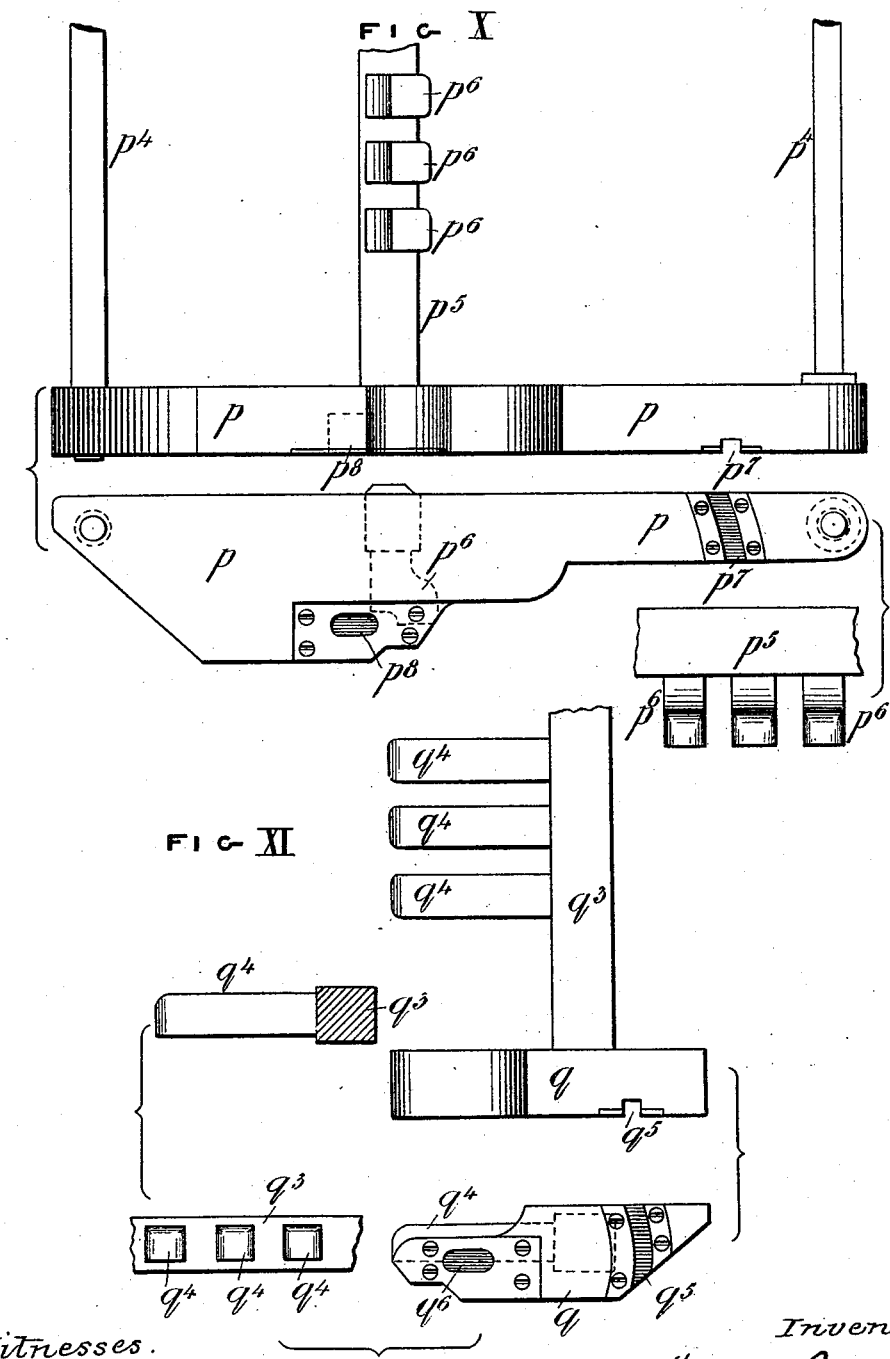

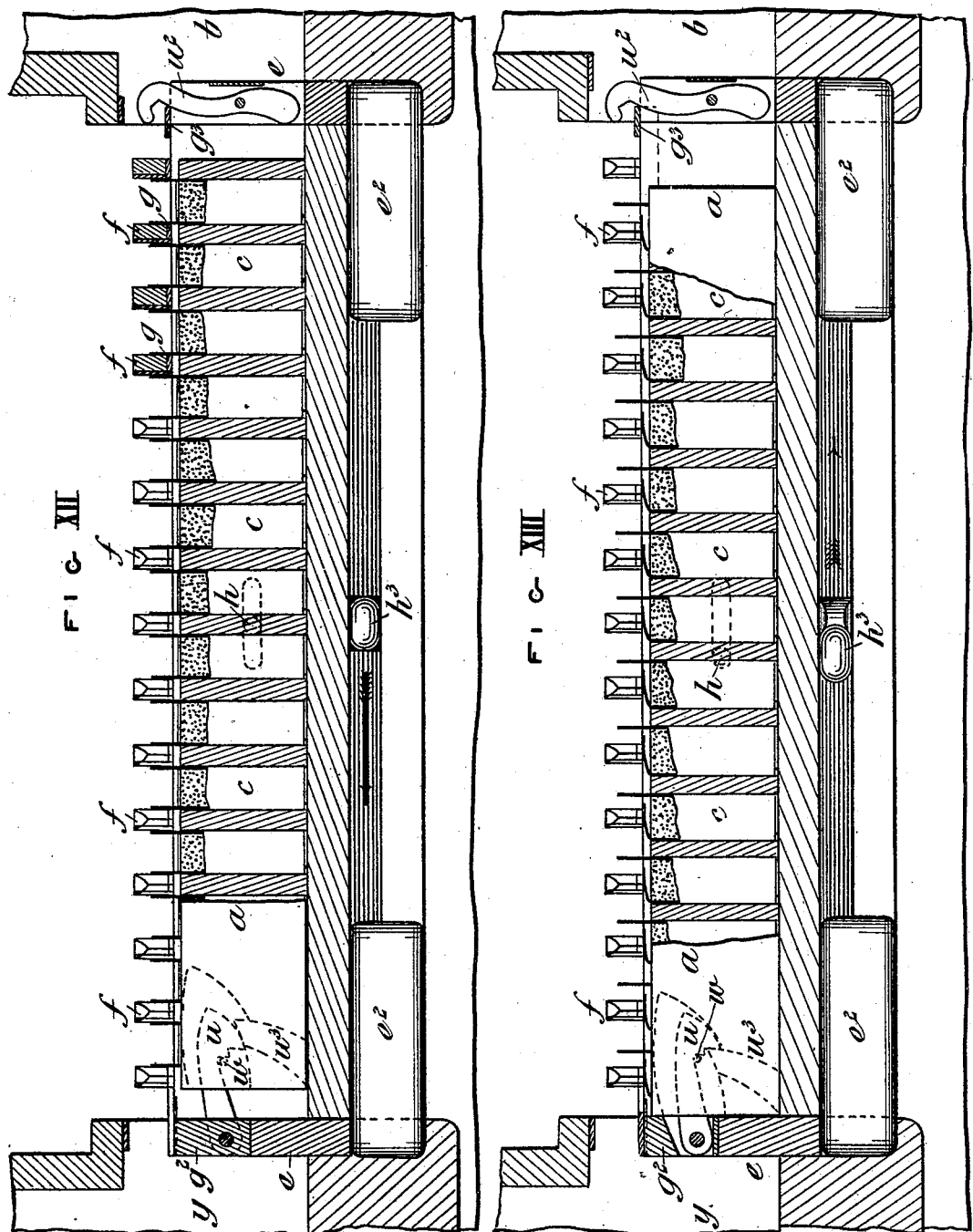

(No Model.) 11 Sheets—Sheet 9.
G. PRITCHARD.
PACKET FOLDING AND COMPRESSING MACHINE.
No. 251,281. Patented Dec. 20, 1881.
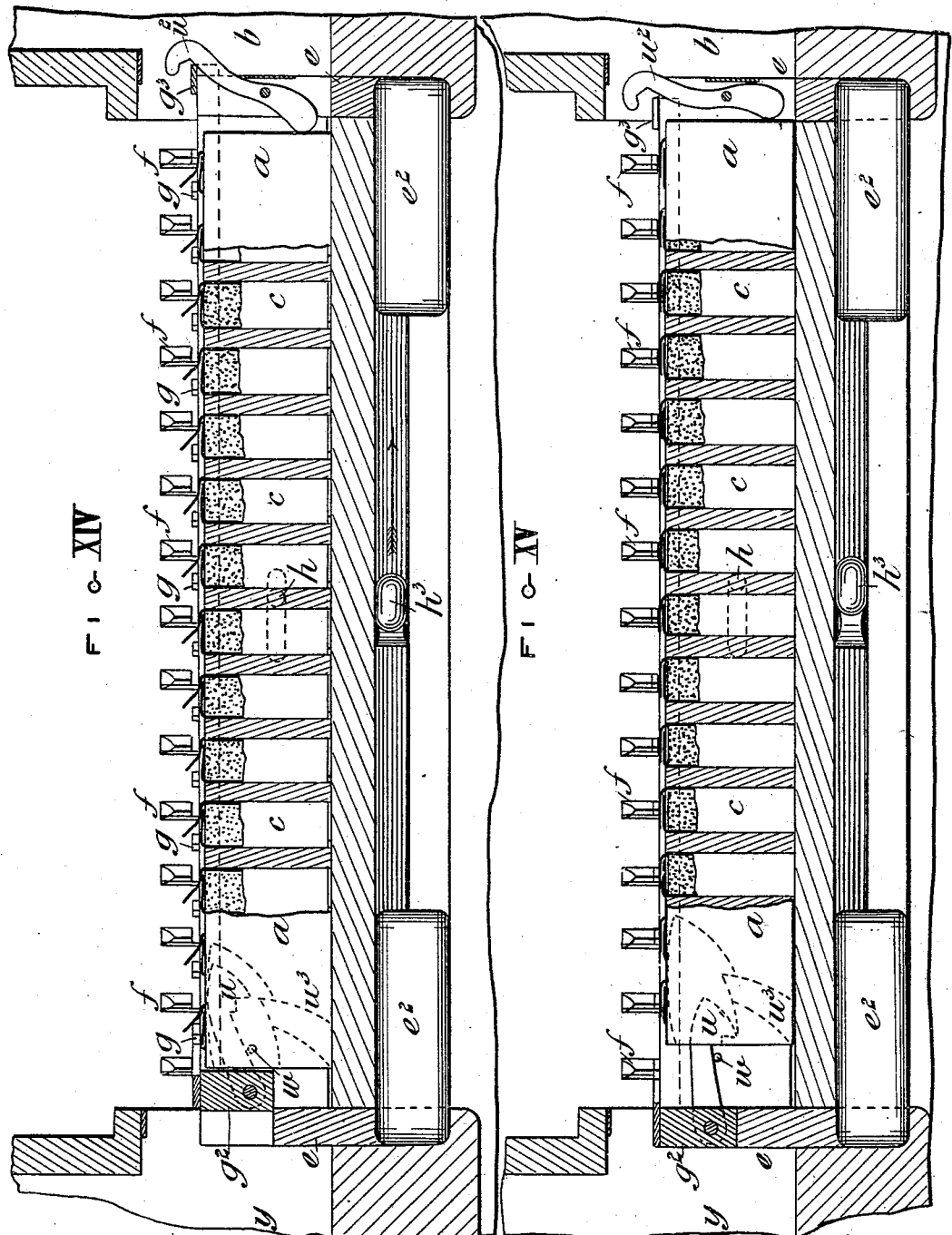
Witnesses:
E. E. Masson
W. B. Masson
Inventor
George Pritchard
by A. Pollok
his attorney

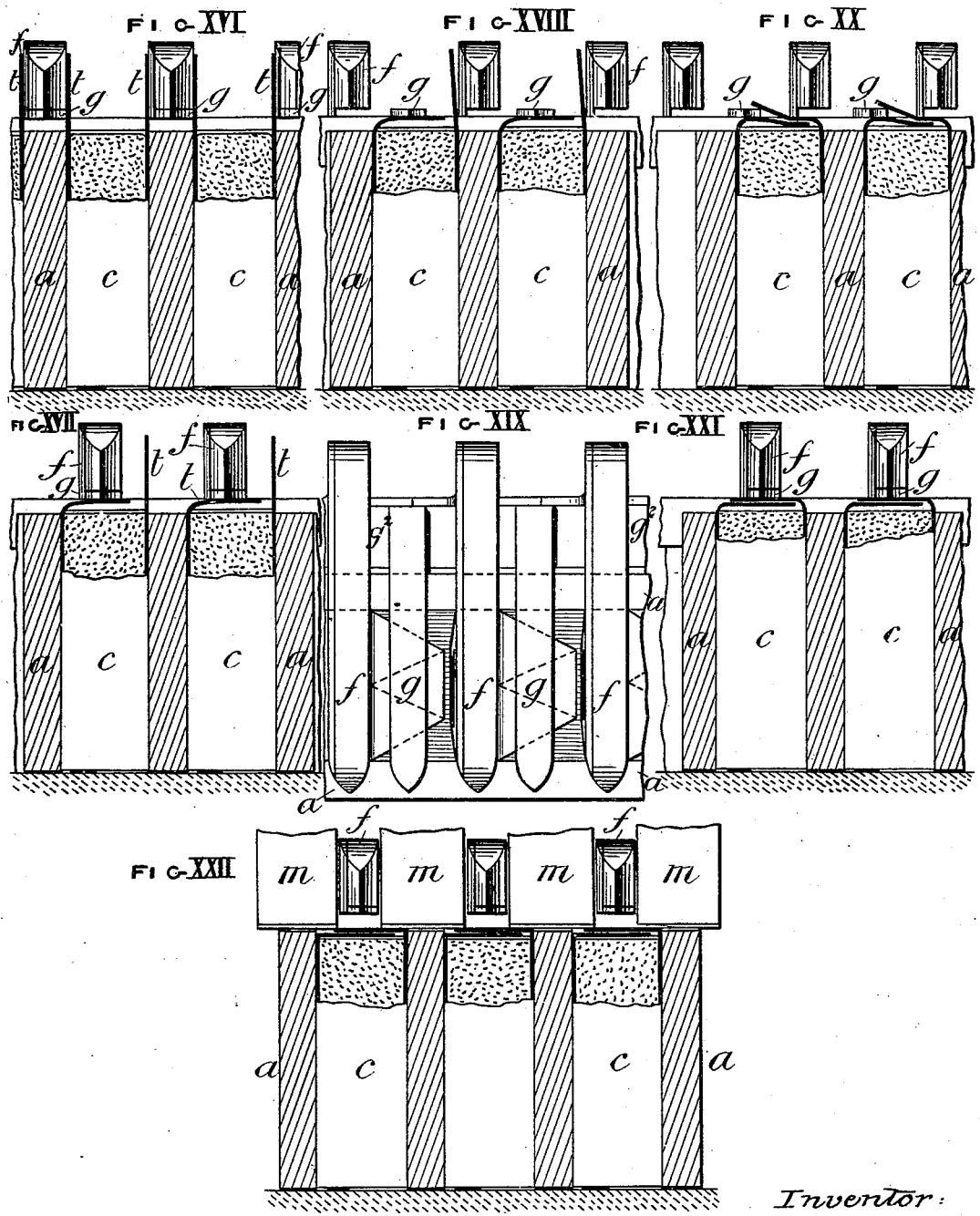

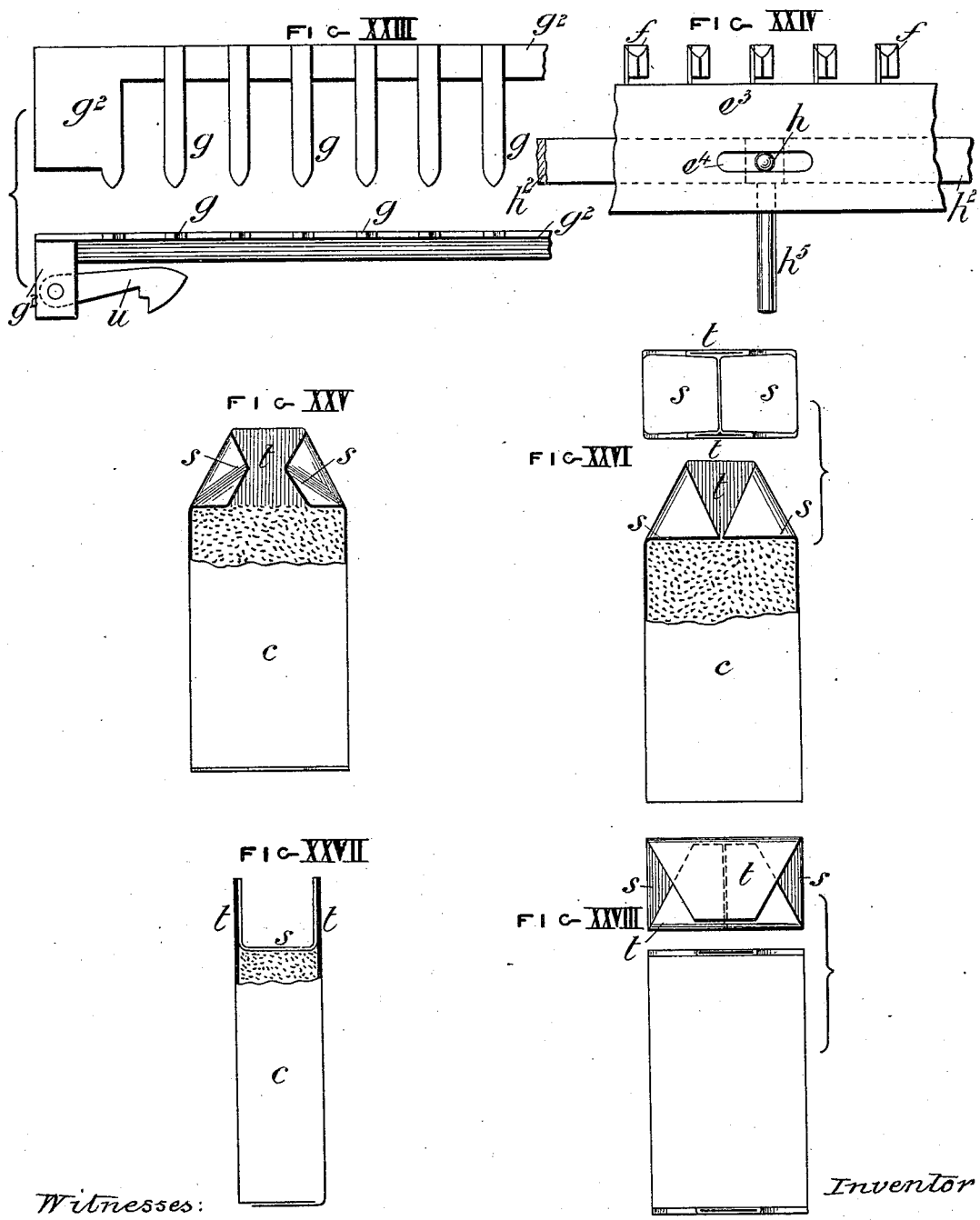

UNITED STATES PATENT OFFICE.

GEORGE PRITCHARD, OF SEAFORTH, NEAR LIVERPOOL, COUNTY OF LANCASTER, ASSIGNOR TO ROBERT SPEAR HUDSON, OF LIVERPOOL, ENGLAND.

PACKET FOLDING AND COMPRESSING MACHINE.

SPECIFICATION forming part of Letters Patent No. 251,281, dated December 20, 1881.

Application filed September 17, 1881. (No model.) Patented in England March 23, 1881.

*To all whom it may concern:*

Be it known that I, GEORGE PRITCHARD, a subject of the Queen of Great Britain, residing at Seaforth, near Liverpool, in the county of Lancaster, England, have invented certain new or Improved Compressing and Folding or Creasing Machinery, to be used in making up packets of powdered materials and other commodities for sale, (for which I have received Letters Patent in England, No. 1,299, dated 23d March, 1881,) of which the following is a specification.

My invention consists of the construction and combination of the parts hereinafter described of machinery for consolidating or compressing the powdered or other material in a series of bag-like wrappers or cases held in the filling-box, hereinafter called the "mold," and for folding down or creasing the open ends of the bags or cases, so as to form them into packets, and also for breaking or "squaring" the creases or folds, and at the same time perfecting the figure of the closed packets. The series of bags or cases having been filled, the box or mold containing them is passed through an aperture in the side of the machine into a race or channel and against a stop, which stop determines the position of the mold for the first movements of the machine. The mold being in the position described, a frame carrying a series of side creasers or fingers is pulled forward. By this movement the side creasers or fingers are made to partly fill up the spaces between the sides of the open ends of the packets in the mold. By the descent of a series of consolidating pistons having the size and figure of the bags, in combination with a series of packet-mouth openers or expanders, consisting of jointed flaps, situated on opposite sides of the pistons, the mouths of the bags are first opened or expanded by the said jointed flaps, and the material in the bags afterward compressed or consolidated by the pistons. The pistons are carried by a rising-and-falling bar and the mouth openers or flaps by a second bar, the two bars being so arranged that the flap-bar coming to rest, the piston-bar continues its motion, carrying the pistons between and separating the flaps, and effecting the consolidating of the material in the bags or packets. The tension-flaps or mouth-openers are counterbalanced, so that they take their closed or partially-collapsed position when the pistons are withdrawn from between them. The next movements of the machine effect the creasing or folding of the open mouths of the packets. The back and front foldings or creasings are effected by means of back and front creaser-arms having rounded pegs or projections upon them for pressing down the back and front parts of the open mouths of the packets. The arms of the back and front creasers have curvilinear slots formed in their sides, and are also furnished with slots in which fixed pins work. On pulling down the back arms of the creasers they turn upon their joint pins, and in their downward movement they come in contact with the short arms of the front-creasers. The back and front creasers now move together and take a horizontal position, the curvilinear slots in the arms taking upon pins on a face-plate, so that by a horizontal movement of the back-creasers the front and back creasers are caused to approach each other in opposite directions. By the first-described movement of the back and front creasers they press down the back and front flaps of the open mouths of the packets into an inclined position, and by the second described or horizontal movement of the said creasers the complete folding of the said front and back flaps is effected, the said flaps meeting in the middle of the packet.

The folding or creasing of the side flaps of the packets is effected in the following manner: In the frame of the side-creasers, hereinbefore described, a bar carrying a horizontal pin slides. This pin, when the side-creasers are moved into position, takes into a hole in the mold carrying the packets, and thereby locks or connects the sliding bar to the said mold, so that by moving the said bar to the right or left hand a corresponding motion is given to the mold. In order to produce the first side creases the mold is moved to the left hand, carrying the packets in the mold against the inner left-hand sides of the creasers. By the same movement of the mold a projection on it engages with a pawl-catch jointed to a frame carrying a sliding toothed or comb plate. On moving the mold to the right hand, so as to reverse the direction of its motion, the comb-plate travels over the first side-folded flaps already produced by the side-creasers and holds them down, while the second side flaps are produced by the further motion of the mold in the same direction by means of the stationary side-creasers, as described, with respect to the first-folded side flaps. The sliding comb presses back a lever, and just before the mold completes its stroke it acts upon the heel of the said lever, which returns the comb to its first position. The movement of the mold to the right hand disengages the pawl-catch from the projection on the mold by the under edge of the said pawl-catch traveling upon a fixed pin attached to the frame of the side-creasers. By the operations described the four folds inclosing the ends of the packets of powdered material are thus produced, the positions of the packets with respect to the side-creasers, after the folding has been effected, being such that the side-creasing bars or creasers cross the middles of the closed ends of the packets. In order that the creases or folds should be perfectly squared or flattened, and the figure of the packets perfected, the consolidating pistons, hereinbefore described, are again made to descend upon the ends of the packets in the mold. The several parts of the machine are now returned to their normal positions, ready to repeat the operations, as hereinafter fully described.

I will now proceed to describe, with reference to the accompanying drawings, the manner in which my invention is to be performed.

Figure I represents a front elevation of the said machinery, partly in longitudinal vertical section, the compressing-pistons and the bag-mouth openers or expanders being represented in their highest or non-acting positions. Figs. II, III, IV, and V represent transverse vertical sections of the said machinery, the working parts being in different positions. Fig. VI represents a longitudinal vertical section of the machinery, with the compressing-pistons and bag-mouth openers in the lowest or acting positions. Figs. VII and VIII represent, drawn to a larger scale, a portion of the machine, exhibiting the construction and action of the compressing-pistons and bag-mouth openers or expanders, together with the side creasers or fingers and comb-plate. Fig. IX represents a plan of the machine, partly in horizontal section, the said Fig. IX exhibiting the positions with respect to one another of the back and front creasers and side-creasers. Fig. X represents one of the jointed arms carrying the back-creasers, and Fig. XI represents one of the jointed arms carrying the front-creasers. Figs. XII, XIII, XIV, and XV represent longitudinal vertical sections of portions of the machine, drawn to a smaller scale, the said Figs. XII, XIII, XIV, and XV exhibiting the successive operations of the side-creasers and the comb-plate used with the said side-creasers, as well as the mechanism for operating the comb-slide and returning it to its original position. Fig. XVI represents a portion of Fig. XII drawn to a larger scale. Fig. XVII represents a portion of Fig. XIII drawn to a larger scale. Figs. XVIII and XIX exhibit the holding-down action of the comb-plate upon the first-folded side creasings or flaps, while the second side creasings or flaps are being folded. Fig. XX represents a portion of Fig. XIV drawn to a larger scale, and Fig. XXI represents a portion of Fig. XV drawn to a larger scale. Fig. XXII represents the action of the compressing-pistons when they are used for effecting the flattening or squaring of the creasers or folds and for perfecting the figure of the closed packets. Fig. XXIII represents a portion of the comb and comb bar or slide and the hooked lever-catch carried by the same. Fig. XXIV represents a front elevation of a portion of the plate carrying the side-creasers in conjunction with the slide by which the mold is moved in its race for effecting the side-creasing of the ends of the packets. Fig. XXV represents a packet the front and back folds of which have been half-creased. Figs. XXVI and XXVII represent one of the packets after the front and back folds have been completely creased, and Fig. XXVIII represents the packet after its folds have been completely folded or creased and the packet closed.

The same letters of reference indicate the same parts in the several figures of the drawings.

After the bags or cases have been filled with the powdered material the mold or divisioned box $a$, containing them, is passed through an opening at $b$ in the side of the machine, into a race or channel forming a continuation of the said opening at $b$, and against a sliding stop, $d$, which partly crosses the said race or channel. The stop $d$ determines the position of the mold $a$ in the machine for the first movements of the said machine. The said stop $d$ is moved by the attendant by means of the handle $d^2$. The mold $a$ having been brought against the stop $d$, as shown in Fig. IV, a horizontal sliding frame, $e$, carrying a series of side creasers or fingers $ff$, and a comb-plate, $g$, and appliances connected therewith, is pulled forward by its handles $e^2 e^2$ into the position represented in Fig. III. By this movement the side creasers or fingers $ff$ are made partly to fill up the spaces between the sides of the open ends of the packets $c c$ in the mold $a$ and support the said sides. The same movement of the horizontal sliding frame $e$ causes a bolt or pin, $h$, carried by the said frame, to enter a hole, $i$, in the back of the mold $a$, and thereby connect the said mold with a locking-bar, $h^2$, working in the upright $c^3$ of the sliding frame $e$. The locking-bar $h^2$ is capable of a limited to-and-fro motion in the upright $e^3$ by the bolt or pin $h$, working in a slot, $e^4$, in the said upright $e^3$, as best seen in Fig. XXIV. The locking-bar $h^2$ is moved by the hand-lever $h^3$, turning on the center $h^4$ on the frame $e$, the rod $h^5$ on the locking-bar taking into a slot in the said hand-lever $h^3$. By moving the hand-lever $h^3$ in one or other direction a corresponding motion is given to the mold $a$, containing the filled packets $c\ c$. The action of connecting the mold $a$ with the locking-bar $h^2$, as described, pushes back the stop $d$ out of the path of the race or channel in which the mold $a$ is situated, the said stop occupying a recess in the sliding frame of the machine. The frame $e$, carrying the side creasers or fingers $f$, fork $g$, and the appliances connected therewith, works on the V-guides $k\ k$ on the lower bed-plate, $k^2$, of the machine, the upper bed-plate, $l$, supporting the mold $a$, containing the filled packets. The machine is now ready to effect the first operation—namely, the consolidation of the powder in the several packets or cases. This is effected by means of the series of compressing-pistons $m\ m$ in conjunction with the series of jointed flaps or packet-mouth openers or expanders $n\ n$. (See the enlarged views, Figs. VII and VIII.) The pistons $m\ m$ are carried by the piston-bar $m^2$, passing from end to end of the machine, the ends of the bar being connected to the slides $m^3\ m^3$, working in guides or dovetails in the standard $m^4\ m^4$ of the machine. The said bar $m^2$ and the pistons $m\ m$ carried by it are depressed by the action of the connected or bar handles or levers $m^5\ m^5$ and links $m^6\ m^6$, and are raised, when at liberty to move, by the counterbalance-weight $m^7$ on the shaft $m^8$, on the ends of which the handles or levers $m^5\ m^5$ are fixed.

The bag-mouth openers or expanders $n\ n$ consist of jointed flaps situated on opposite sides of the pistons $m\ m$, and are so weighted that they take, when at liberty to move, the normal position represented in Fig. VII. The several bag-openers, $n\ n$, are carried by the bar $n^2$, which has at its ends connected slides $n^3\ n^3$, working upon the slides $m^3\ m^3$, carrying the piston-bar $m^2$. At the right-hand end of the machine (represented in Fig. VI) the slide $n^3$ of the mouth-opener bar $n^2$ is shown in section, and at the left-hand end of the said Fig. VI the slide $m^3$ of the piston-bar $m^2$ is shown in section. The section of the slide $n^3$ is taken on the line $n^4$, and the section of the slide $m^3$ is taken on the line $n^5$, Fig. III. Each of the mouth-opener slides $n^3$ has in its inner face a slot, $n^6$, which works upon a fixed stud or stop-pin, $n^7$, on the upright $m^4$ of the machine. The object of this construction is to bring the mouth-openers to rest after they have descended the proper distance, while permitting of the farther descent of the pistons to effect the consolidating operation. As the piston-bar $m^2$ is carried down by pressing upon the handle $m^5$, the mouth opener bar $n^2$ is carried with it until the mouth-openers $n\ n$ enter the mouths of the bags $c\ c$, when they come to rest by the tops of the slots $n^6$ in the slides $n^3$ striking against the stop-pins $n^7$. The continued motion of the piston-bar $m^2$ carries the pistons $m$ between the flaps or mouth-openers $n\ n$, thereby separating them and causing them to open or expand the mouths of the bags ready to receive the pistons $m\ m$, which pistons, entering the said mouths, effect the consolidating of the material in the said bags, as will be understood by an examination of Figs. VII and VIII and the full sectional views, Figs. III and VI. On loosening the bar-handle $n^5$ the pistons $m$ and mouth-openers $n$ take their highest position, as represented in Figs. I, II, IV, and V, by the action of the weighted shaft $m^8$. As the piston-bar $m^2$ rises it strikes against the cross-pieces $n^8$ of the mouth-opener slides and takes the latter slides with it.

Having thus effected the consolidating of the powder in the packets, the open ends of the packets are next folded down or creased by the following construction and combination of parts. I will first describe the construction and action of the mechanism for effecting the back and front creasings—that is, those flaps at the shorter ends of the packets.

The back-creaser consists of jointed arms $p\ p$ at each end of the machine, the said arms turning on joint-pins $p^2$ on the fixed uprights $p^3\ p^3$ of the machine. (See Figs. I and IX.) The jointed arms $p\ p$ are connected together by the rods $p^4\ p^4$, which also serve as handles. On a cross-bar, $p^5$, connected to the arms $p\ p$, is a series of rounded pegs or projections, $p^6$, constituting the acting parts of the back-creaser. A separate view of one of the arms and some of the pegs or projections of the back-creaser is represented in Fig. X. In the arms $p\ p$ of the back-creaser are curvilinear slots $p^7$, for the purpose hereinafter explained, and also straight slots $p^8$, for the joint-pins $p^2$ to work in.

The front-creaser consists of jointed arms $q\ q$, turning on the joint-pins $q^2\ q^2$ on the fixed uprights $p^3\ p^3$ of the machine. The cross-bar $q^3$ on the front-creaser arms $q\ q$ carries a series of rounded pegs, $q^4$, which constitute the acting parts of the front-creaser. A portion of the front-creaser is shown in Fig. XI. The jointed arms $q\ q$ of the front-creaser have curvilinear slots $q^5\ q^5$ in them, and also straight slots $q^6\ q^6$. In the slots $q^6\ q^6$ the joint-pins $q^2\ q^2$ work. At each end of the machine is a face-plate, $r$, having two crank-pins, $r^2\ r^2$, upon it. The face-plates $r\ r$ work in recesses in the uprights $p^3\ p^3$ and turn upon the centers $r^3\ r^3$ on the said uprights. The face-plates $r\ r$ and the back and front creasers are so weighted that when at liberty to move they take the normal positions represented in Figs. II and III.

In order to fold or crease the front and back flaps of the mouths of the bags, the arms $p\ p$ of the back-creaser are pulled down by the attendant by means of the upper cross-rod of the said arms $p\ p$. On pulling down the said back-creaser arms they turn upon their joint-pins $p^2\ p^2$, and in their downward movement they come in contact with the short ends of the arms $q\ q$ of the front-creaser. The back and front creasers now move together and take the horizontal position represented in Fig. IV, the curvilinear slots $p^7$ and $q^5$ in the said arms $p$ and $q$ taking upon the crank-pins $r^2$ $r^2$ on the face-plates $r$ $r$, as represented in the said Fig. IV. By the attendant now pulling the back-creaser arms $p$ $p$ toward him a horizontal movement is given to the back-creaser, and the front and back creasers, which are geared to the face-plates $r$ $r$, are caused to approach each other in opposite directions, and are made to occupy the positions represented in Fig. V. By the first movement of the back and front creaser arms into the positions represented in Fig. IV the rounded pegs or projections $p^6$ and $q^4$ of the creasers press down the front and back flaps, $s$ $s$, of the open mouths of the packets into the inclined position represented in Fig. XXV, so as to half-crease the said front and back flaps, and by the second or horizontal movement of the creasers into the position represented in Fig. V the complete folding of the said front and back flaps is effected, the said flaps meeting in the middle of the packet, as illustrated in Fig. XXVI. The attendant next looses the bar-handle of the back-creasers $p$ $p$, when the said back-creasers, the front-creasers, and the face-plates automatically return to their normal positions, Fig. II. The folding or creasing of the side flaps, $t$ $t$, Figs. XXVI and XXVII, of the packets upon the folded front and back flaps, $s$ $s$, is next effected by the action of the stationary side creasers or fingers $f$ $f$ and the holding-down comb-plate $g$ $g^2$, in conjunction with the movement of the mold carrying the partially-closed packets.

It has been described that the forward movement of the sliding frame $e$ has carried the side-creasers and comb-plate $g$ $g^2$ between the packets $c$ $c$ in the mold $a$, and has also effected the locking of the mold $a$ with the sliding bar $h^2$ and lever or handle $h^3$. The comb-plate $g$ $g^2$, which is used for holding down one of the side flaps during the folding of the other side flap, is capable of a limited sliding motion, the bar $g^2$ of the comb-plate working in guides on the bar carrying the fixed side-creasers $f$ $f$. (See Fig. XIX.) One end of the comb-plate bar $g^2$ carries a lever-catch, $u$, and the cross-piece $g^3$, at the opposite end of the said comb-plate bar, is made to act upon the lever $u^2$, jointed to the frame $e$, carrying the side fingers or creasers. The lever-catch $u$ works in a recess in the side of the mold $a$, and the said mold is furnished with a projection, $u^3$, which, at the proper time, is made to engage with the lever-catch $u$, for connecting the comb-plate with the mold. When the teeth $g$ of the comb-plate are in their normal positions they occupy spaces or recesses under the side-creasers $f$ $f$, and are coincident therewith; but when they are put into action they slide from under the said fixed side-creasers $f$ $f$, as hereinafter particularly explained. The action of the side-creasers and comb-plate will be best understood by referring to the sectional views, Figs. XII, XIII, XIV, and XV, and the part sectional views, drawn to a larger scale, Figs. XVI, XVII, XVIII, XIX, XX, and XXI. The parts being in the respective positions represented in Figs. XII and XVI, the hand-lever $h^3$ is moved to the left hand, carrying the mold $a$ with it, as indicated by the arrow in Fig. XII. By this movement the packets $c$ $c$ in the mold are carried against the stationary creasers $f$ $f$, and the left-hand sides of the side flaps are folded or creased, as illustrated in Figs. XIII and XVII. By the movement described of the mold $a$, the arm or projection $u^3$ on the said mold is made to engage with the lever-catch $u$ on the bar $g^2$ of the comb-plate $g$, as illustrated in Fig. XIII. The comb-plate $g$ is thus connected with the mold $a$. By now moving the mold $a$ to the right hand, or reversing its motion by acting on the handle $h^3$, as indicated by the arrow in Fig. XIII, the mold carries with it the comb-plate $g$, the teeth of the said comb-plate moving from under the side-creasers $f$ $f$ and traveling over and holding down the side-folded flaps already produced, as illustrated in Figs. XVIII and XIX. By the continued movement of the handle $h^3$ to the right hand the second side flaps of the packets, held in the mold, are carried against the stationary creasers $f$ $f$, and the said second side flaps are folded upon the first-described folded side flaps, as illustrated in Figs. XIV and XV and the enlarged views, Figs. XX and XXI. In Figs. XIV and XX the second side flaps are represented in the act of being folded and in Figs. XV and XXI are represented completely folded. As the folding of the second side flaps proceeds the comb-plate $g$ is removed from the first-folded side flaps in the following manner: the motion of the mold $a$ to the right hand to bring the comb-plate $g$ into action causes the catch $u$ to travel upon a fixed pin, $w$, on the frame carrying the side-creasers, and on the further motion of the mold in the same direction for effecting the creasing of the second side flaps the pin $w$ lifts the lever-catch $u$ from the projection $u^3$, and the mold is thereby disengaged from the sliding comb-plate. The sliding comb-plate $g$, in its outward motion to the position Figs. XVIII and XIX, causes the cross-piece $g^3$ on the comb-plate bar to press back the lever $u^2$, so that its heel bears against the end of the mold $a$, as seen in Fig. XIV. By the continued motion of the mold to the right hand to effect the creasing of the second side flaps the said mold operates upon the lever $u^2$, and the latter returns the comb-plate $g$ to its first position, as illustrated in Fig. XV. By the operations described the four folds $s$ $s$ and $t$ $t$, inclosing the ends of the packets in the mold, are thus produced, as illustrated in Fig. XXVIII, the position of the closed packets with respect to the side creasers or fingers $f$ $f$ being such that the said side-creasers cross the middles of the closed ends of the packets, as illustrated in Figs. XV and XXI.

For the purpose of squaring or flattening the edges of the folded flaps $s$ $s$ $t$ $t$ of the packets, and for perfecting the figure of the packets, the compressing-pistons $m\ m$ are again made to descend upon the ends of the packets in the mold, as illustrated in Fig. XXII. The packet-mouth openers descend with the pistons, but they are inoperative, as they do not reach the now closed packets. The pistons $m\ m$ are allowed to rise, and the frame $e$, carrying the side fingers or creasers $ff$ and other parts, is pushed back into its normal position, so as to remove the fingers or creasers $ff$ from over the packets and unlock the frame from the mold. The mold containing the packets can now be taken from the machine. As the frame $e$ is pushed back the rod $h^5$ strikes against the incline $x$ (see Fig. IX) on the bed-plate of the machine. The locking-pin $h$ is thereby returned to its original position, so that on again drawing forward the frame $e$ the said pin $h$ will engage in the hole in the fresh mold which has been advanced to the stop $d$ in the mold-race, as before described. The mold charged with the closed packets is removed from the mold-race through the opening $y$ in the delivery end of the compressing and creasing machine, and is passed onto the table of a mold-emptying apparatus, by which the mold is emptied, and the packets are afterward rewrapped and labeled, ready for sale.

Besides making up for sale packets of powdered materials, the machinery described and represented may be used for making up for sale packets of other commodities, such as sugar, tea, seeds, and the like.

Having now described the nature of my invention and the manner in which the same is to be performed, I wish it to be understood that I claim as my invention of the new or improved machinery represented in Figs. I to XXV, both inclusive, of the accompanying drawings for consolidating or compressing the powdered material or other commodity in the bag-like wrappers or cases, for creasing or closing the open ends of the said wrappers or cases, for breaking or squaring the creases or folds, and for perfecting the figure of the closed packets—

1. The combination of the parts of the compressing-pistons and jointed flaps or bag mouth openers or expanders, and the mechanism described and illustrated for working the said pistons and flaps, the said parts being arranged and operating substantially as described and illustrated.

2. The combination of the sliding frame and the stationary side creasers or fingers and sliding holding-down comb-plate carried by the said frame, the several parts being arranged and operating substantially as and for the purposes described and illustrated.

3. The jointed front and back creasers, in combination with the double-pinned face-plates, for the purposes and substantially as described and illustrated.

4. The combination of the stationary side creasers or fingers and the holding-down comb-plate with a sliding mold or box containing the packets to be operated upon, for effecting the creasing or folding of the side flaps of the packets, and the mechanism described and represented for operating the comb-plate at the proper time by the motion of the said mold or box.

5. A machine for making up packets of powdered and other material, comprising a sliding frame or support for the mold containing the packets, compressing pistons, mouth openers or expanders, jointed front and back creasers, stationary side-creasers, and holding-down plate, substantially as described.

GEORGE PRITCHARD. [L. S.]

Witnesses:
  W. P. PAULL,
*Vice and Deputy Consul U. S. A., at Liverpool.*
  W. J. SULIS,
*U. S. Consulate, Liverpool.*